United States Patent
Ali-Santosa et al.

(10) Patent No.: US 8,261,133 B1
(45) Date of Patent: Sep. 4, 2012

(54) PROTECTION AND RECOVERY OF NON-REDUNDANT INFORMATION STORED IN A MEMORY

(75) Inventors: Gunawan Ali-Santosa, Milpitas, CA (US); Rajeev Bharol, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 1743 days.

(21) Appl. No.: 11/499,271

(22) Filed: Aug. 4, 2006

(51) Int. Cl.
*G06F 11/00* (2006.01)

(52) U.S. Cl. ............ 714/54; 713/1; 714/6.1; 714/6.11; 714/6.12; 714/6.31

(58) Field of Classification Search ....... 713/1; 714/6.1, 714/6.11, 6.12, 6.31, 54
See application file for complete search history.

(56) References Cited

U.S. PATENT DOCUMENTS

| | | | |
|---|---|---|---|
| 6,816,985 B2 * | 11/2004 | Ali-Santosa et al. ...... 714/38.14 |
| 6,957,328 B2 * | 10/2005 | Goodman et al. ................ 713/2 |
| 7,191,327 B2 * | 3/2007 | Viljoen et al. .................... 713/2 |
| 7,266,731 B2 * | 9/2007 | Ali-Santosa et al. ........... 714/42 |
| 7,409,539 B2 * | 8/2008 | Arnez et al. ................. 713/100 |
| 7,702,952 B2 * | 4/2010 | Tarra et al. ................... 714/6.11 |
| 8,041,988 B2 * | 10/2011 | Tarra et al. ................... 714/6.11 |
| 2003/0093708 A1 * | 5/2003 | Ali-Santosa et al. ............. 714/4 |
| 2003/0093719 A1 * | 5/2003 | Ali-Santosa et al. ........... 714/38 |
| 2003/0093782 A1 * | 5/2003 | Ali-Santosa et al. ......... 717/175 |
| 2003/0191930 A1 * | 10/2003 | Viljoen et al. .................... 713/1 |
| 2004/0054883 A1 * | 3/2004 | Goodman et al. ................ 713/1 |
| 2004/0153724 A1 * | 8/2004 | Nicholson et al. ................ 714/6 |
| 2004/0158699 A1 * | 8/2004 | Rhoads et al. .................... 713/1 |
| 2004/0225873 A1 * | 11/2004 | Diaz ................................ 713/1 |
| 2004/0255106 A1 * | 12/2004 | Rothman et al. .................. 713/1 |
| 2007/0033387 A1 * | 2/2007 | Arnez et al. ...................... 713/1 |
| 2007/0168707 A1 * | 7/2007 | Kern et al. ........................ 714/6 |
| 2010/0192007 A1 * | 7/2010 | Tarra et al. ........................ 714/6 |

* cited by examiner

*Primary Examiner* — Scott Baderman
*Assistant Examiner* — Joshua P Lottich
(74) *Attorney, Agent, or Firm* — Martine Penilla Group, LLP

(57) ABSTRACT

The present invention is a method, computer-readable medium and an apparatus for protection and recovery of non-redundant computer-readable information stored in a memory having multiple segments that features replacing computer-readable information stored in one of the multiple segments based upon a determination that computer-readable information stored in one of the remaining segments of the multiples segments is in a desired state. To that end, the memory device operates synergistically with a shelf manager, which maintains a state of computer-readable information in the differing address ranges of the memory device, so that any computer-readable information replaced in memory device may be achieved by executing uncorrupted computer-readable information stored in the memory device.

13 Claims, 8 Drawing Sheets

PROTECTION AND RECOVERY OF NON-REDUNDANT INFORMATION STORED IN A MEMORY

BACKGROUND

As is well known in the computer-related arts, software code is often improved resulting in additional versions, also know as updates, of the same that are backwards compatible with existing physical computer architectures designed to facilitate executing the same. Often several versions of software code occur during computer architecture development and many may occur after computer architecture has been placed in operation by an end-user, e.g., customer. The intended purpose of computer code updates is to improve the overall function of the architecture and, at times, increase the operational life of the same. As a result, reliably and efficiently providing software code updates is important in both the development and operation of computer architectures.

For example, a common impetus for generating software code updates is to ameliorate, if not obviate, problems, often referred to as "bugs", with existing software code. Another impetus for generating software code updates is to provide existing computer architecture with additional functionality or improved functionality of an end-user-specific task. One drawback with providing software code updates is the risk of the occurrence of code corruption. Code corruption may result from a myriad of causes: operator error, power failure during update and the like. Code corruption may either result in either patent or latent functionality problems. For example, the computer architecture may become inoperative due to code corruption. Alternatively, the computer architecture may appear to be operating correctly and produce erroneous results or may produce a time-delayed patent problem, e.g., become inoperable some time after the update occurred. Therefore, there have been prior art attempts to avoid the problems associated with code corruption.

FIG. 1 describes a prior art attempt to ascertain the existence of code corruption that includes comparing the value of a segment of a software code update with a predetermined value and comparing the same with an expected value. At function 100, the code is downloaded to an embedded device (not shown). At function 105, a previously downloaded byte is read from the embedded device (not shown). At function 110, the byte is compared to the expected value. At function 115, a determination is made regarding whether the byte value matches the expected value. At function 120 an indication that the code is corrupted is made if the byte value does not match the expected value and the process ends at function 135. If the byte value matches the expected value, at function 125 a determination is made regarding whether there is another byte to check. This process continues until all bytes in the program have been checked. Were all of the bytes checked and determined to match their expected values, an indication that the program is valid occurs at function 130.

Referring to FIG. 2, a prior art method of overcoming the existence of corrupted code is described as including redundant copies of the same in a memory space (not shown). At function 301 the software code update is downloaded into the memory space (not shown). At function 305 differing copies of the program are stored in differing addresses of the memory space (not shown). For example, a first copy of the program code is maintained in a first set of addresses in the memory space (not shown) referred to as main flash memory (not shown). An additional copy of the program code is maintained in a second set of addresses in the memory space (not shown) referred to as boot flash memory (not shown). At function 310 execution of the program code commences in boot flash memory (not shown), and at function 315 a determination is made regarding whether code stored in the main flash memory (not shown) is corrupted. Were the program code stored in the main flash memory (not shown) corrupted, the copy of the program code stored in the boot flash memory (not shown) is executed at function 320. Were the program code stored in the main flash memory (not shown) not corrupted, a copy of the program code in main flash memory is executed at function 325. A drawback with this recovery technique is that at least twice the amount of memory space is required to provide recovery. In addition, were the program code in both main memory and boot memory corrupted recovery would be problematic.

A need exists, therefore, for an improved technique to overcome the drawback of code corruption.

SUMMARY

The present invention is a method, computer-readable medium and an apparatus for protection and recovery of non-redundant computer-readable information stored in a memory having multiple segments that features replacing computer-readable information stored in one of the multiple segments based upon a determination that computer-readable information stored in one of the remaining segments of the multiple segments is in a desired state. Specifically, it was determined that by ensuring that information in at least one of the memory segments was in a desired state, i.e., uncorrupted, an update of information in one of the remaining segments of the memory would not pose a risk of catastrophic failure of the memory device should the segment being updated become corrupted. To that end, the memory device operates synergistically with a shelf manager, which maintains a state of computer-readable information in the differing address ranges of the memory device, so that any computer-readable information replaced in memory device may be achieved by executing uncorrupted computer-readable information stored in the memory device. Other aspects of the invention will become apparent from the following detailed description, taken in conjunction with the accompanying drawings, illustrating by way of example the principles of the invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention. It should be appreciated that the present invention can be implemented in numerous ways, including as a process, an apparatus, a system, a device, or a method. Several exemplary embodiments of the invention will now be described in detail with reference to the accompanying drawings.

Figure 1:
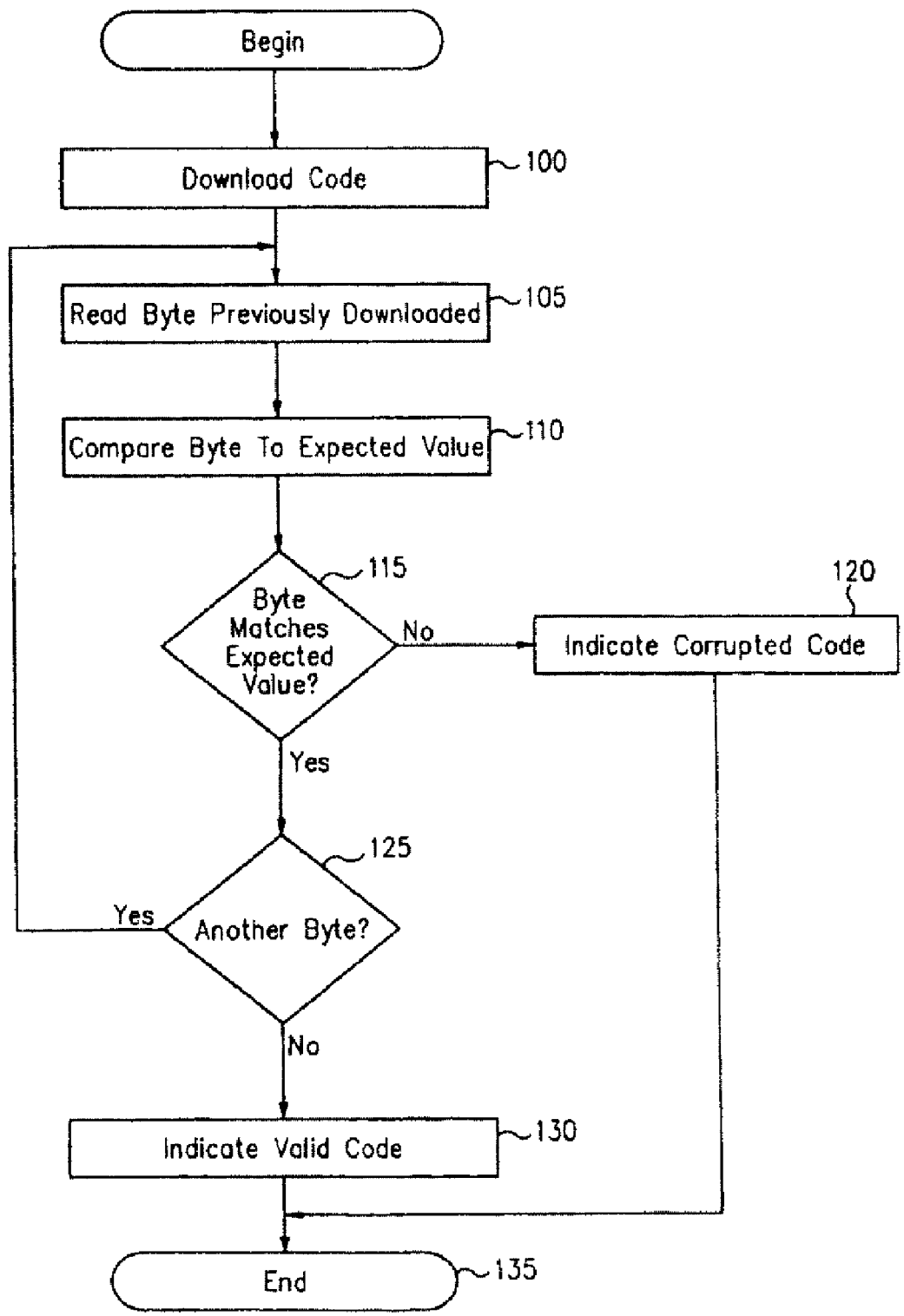
FIG. 1 is a flow diagram that illustrates a typical prior art method for detecting corrupted code by comparing the value of each storage unit downloaded to a device with the corresponding value of the storage units read back from the device.
Figure 2:
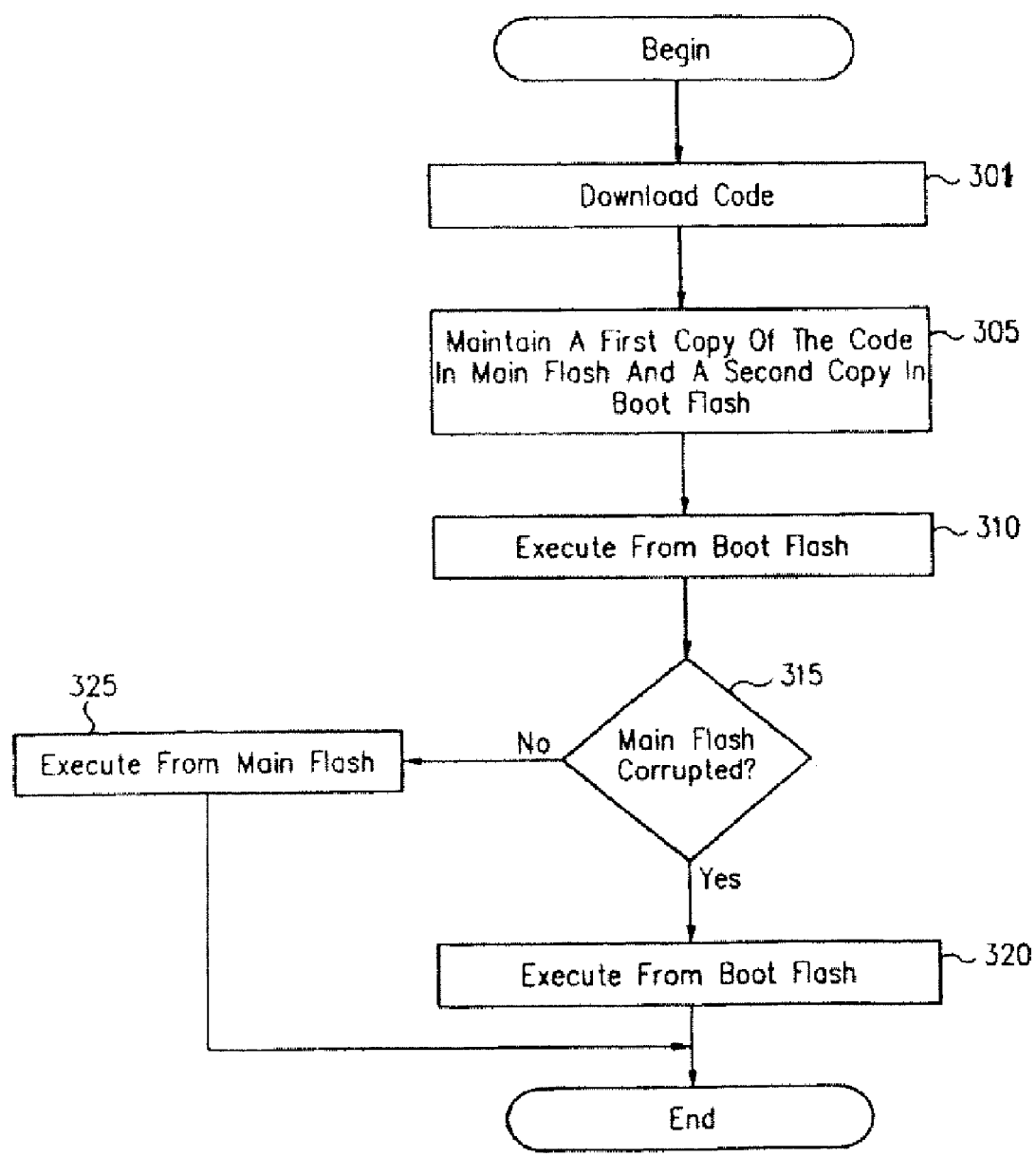
FIG. 2 is a flow diagram that illustrates a prior art method for updating code on an embedded device using separate copies of the program in a boot flash memory and a main flash memory.
Figure 3:
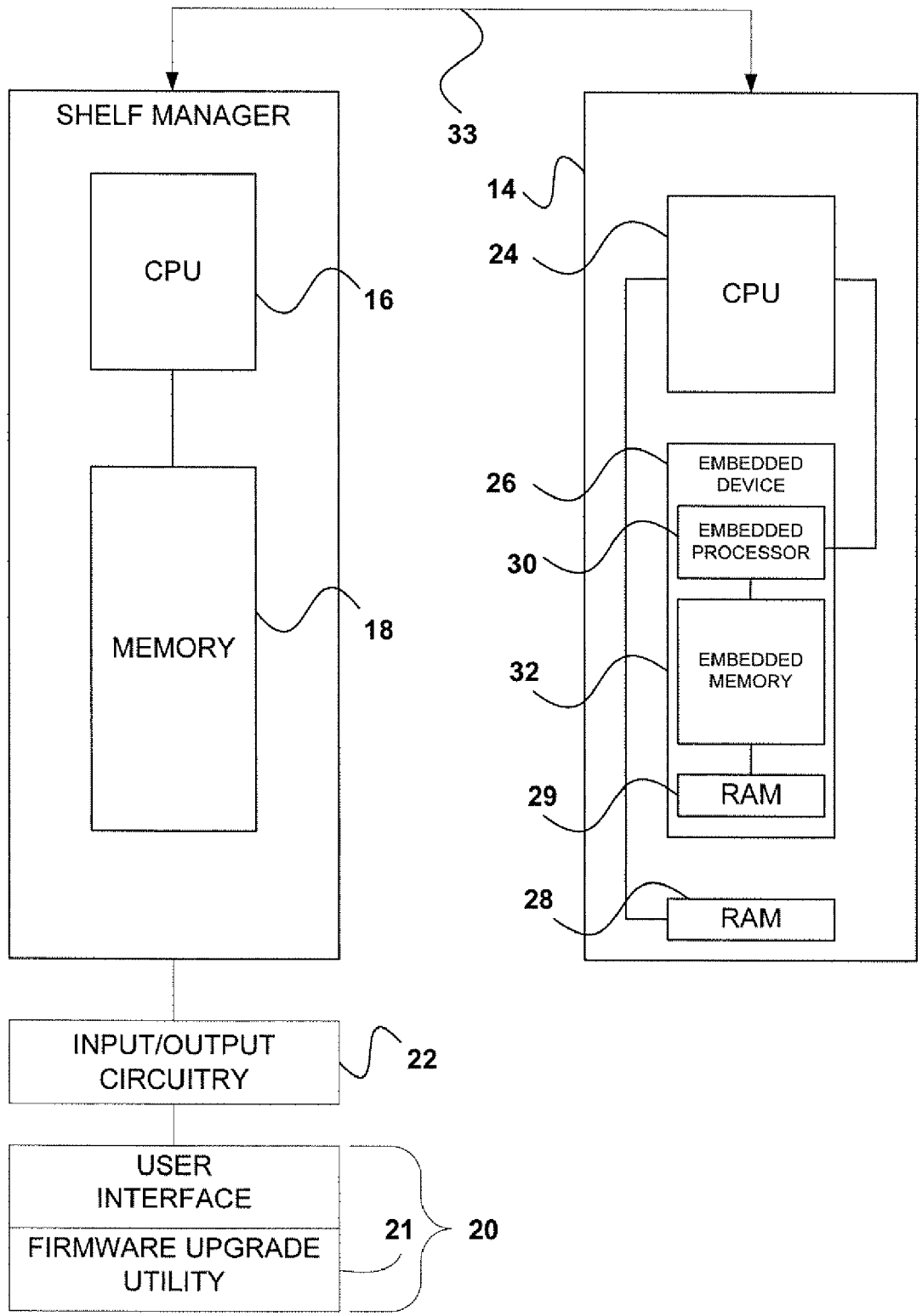
FIG. 3 is a block diagram that illustrates a computer system suitable for implementing aspects of the present invention.

Referring to FIG. 3 a system 10 in which the present invention is employed includes a shelf manager 12 and an application specific device referred to as a blade 14. Shelf manager 12 includes a central processing unit (CPU) 16 in data communication with a memory space 18. Access to shelf manager 12 by an end user (not shown) is achieved through a user interface 20 in data communication with input/output circuitry 22. User interface 20 may include any interface known in the art including a keyboard (not shown), a mouse (not shown), a monitor (not shown) and the like. Moreover, user interface 20 may be integrally formed with shelf manager 12 or may be a separate computing system (not shown) that is operating any one or more of a number of operating systems, such as WINDOWS®, LINUX and the like. Nonetheless, user interface 20 includes a firmware upgrade utility 21 that facilitates communication between shelf manager 12 and blade 14 in accordance with the embodiments of the present invention.

Blade 14 includes a CPU 24 in data communication with an embedded device 26. A random access memory space 28 is in data communication with CPU 24. Embedded device 26 includes an embedded processor 30 and an embedded memory 32 in data communication therewith. Also included in embedded device 26 is a random access memory space 29 in data communication with embedded processor 30. Embedded processor 30 and CPUs 16 and 24 may be any known in the art, including, but not limited to an H8 microcontroller available from Renesas Technology of America of San Jose, Calif. Memory space 18 may include any known memory device such as a hard diskette drive, floppy diskette drive, optical compact diskette drive, tape drive, volatile and non-volatile random access memories or a combination thereof. Embedded memory 32 may include any known memory such as electronically erasable programmable read only memory (EEPROM) or Flash memory.

Shelf manager 12 and blade 14 may be in data communication, either constantly or selectively, employing any known data communications technology via-a-vis link 33. To that end, shelf manager 12 may communicate with blade 14 over a data bus or over a wide area network (WAN), such as the internet, a local area network (LAN) employing well know communication protocols. Typically used may be IPM bus (Intelligent Platform Management Bus) which is an I2C bus on a physical layer employing an IPMI protocol. Blade 14 is typically a sub-system of a larger system (not shown) that may facilitate any number of a myriad of operations in furtherance of one or more business models, such as telecommunications, banking transactions, manufacturing management, business accounting and the like. To that end, embedded memory 32 typically stores an application that is operated on by embedded processor 30 to carry-out a number of desired functions. The functions may be called automatically by embedded processor 30 in a predetermined routine with interruption vis-à-vis CPU 24 in response to commands/requests from shelf manager 12 or other subsystems (not shown) that are part of the system (not shown) in which blade 14 is included.

Figure 4:
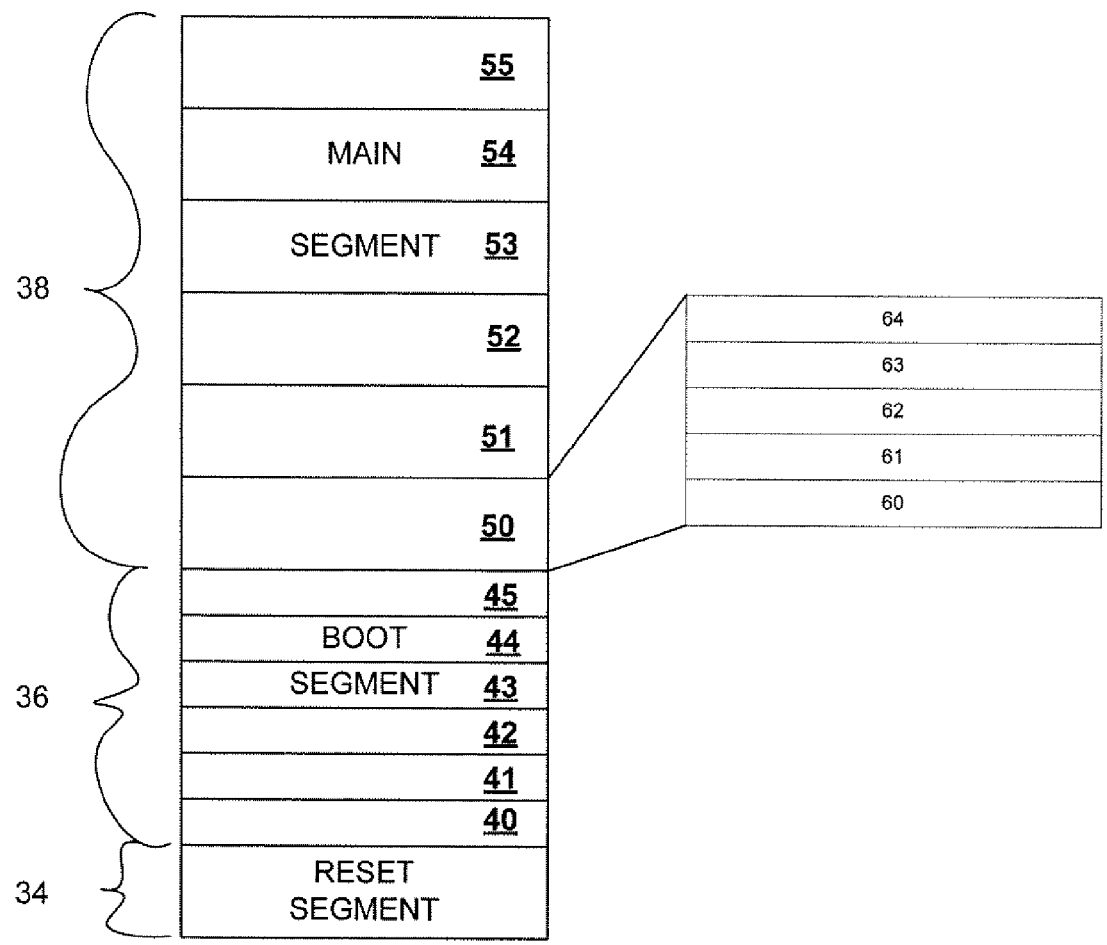
FIG. 4 is a detailed plan view showing the mapping of a memory shown in FIG. 3, in accordance with one embodiment of the present invention.

Referring to both FIGS. 3 and 4, an important consideration implemented by the present system 10 is protecting information stored in embedded memory 32 to an extent required to maintain operation of blade 14 in the presence of code corruption of the application program. To that end, shelf manager 12 and blade 14 operate synergistically to ensure that no information is replaced in embedded memory 32 without ensuring a desired portion of the computer-readable information stored therein is uncorrupted Embedded memory 32 includes, in addition to the application program, additional computer-readable information mapped therein to ensure operation of blade 14 in the presence of code corruption. The computer-readable information is mapped into embedded memory 32 so as to be segmented in three ranges of addresses, a first range of addresses is referred to as a reset segment 34, a second range of addresses is referred as a boot segment 36 and a third range of addresses is referred to as a main application segment 38. Specifically, each boot segment 36 and main segment 38 is mapped as a plurality of sectors defined by sequential memory addresses, shown as 40-45 and 50-55, respectively. It should be noted that the number of sectors shown are exemplary. Each segment 34, 36 and 38 includes a pair of boundary sectors associated with a pair of spaced-apart memory addresses that demarcating the boundary for each of segments 34, 36 and 38. Boot segment 36 includes boundary sectors sector 40 and 45. Each of sectors 41, 42 and 43 having addresses between boundary sectors 40 and 45 are included in boot segment 36. Similarly, main segment 38 includes boundary sectors sector 50 and 55. Each of sectors 51, 52, 53 and 54 having addresses between boundary sectors 50 and 55 are included in main segment 38. Finally, reset segment 34 may or may not include boundary sectors, as discussed above. In the present example, reset segment 34 does not include multiple sectors.

Boot segment 36 stores computer-readable information to perform power-on tests and self-test, and main segment 38 stores computer-readable information for application specific software. Boot segment 36 is associated with a different range of memory addresses from main segment 38 so that blade 14 may continue to operate in the situation where the computer-readable information in main segment 38 becomes corrupted. As a result, the computer-readable information contained in boot segment 36, in addition to being sufficient to boot-up blade 14, also communicates with shelf-manager 12 to, inter alia, replace the computer-readable information in main segment 38 should the same become corrupted or other causes blade 14 not to function as desired. This is referred to as a recovery operation. Should it not be possible to perform boot operations of blade 14 by executing computer-readable information in boot segment 36, boot operations may be executed from computer-readable information in main segment 38. Thus, in addition to the main application program, main segment 38 includes computer-readable information sufficient to perform the boot operation of blade 14. This is referred to as a boot support operation. Additionally, to ensure operation of blade 14, it is desired that the computer-readable information in main segment 38 be sufficient to communicate with shelf-manager 12 to, inter alia, replace the computer-readable information in boot segment 36 should the same be corrupted, e.g. perform a recovery operation of boot segment 36 computer readable-information.

Reset segment 34 stores hardware specific information indicating the hardware attached to blade 14, as well as diagnostic code to determine whether computer-readable information in either boot segment 36 or main segment 38 is in a desired, non-corrupted state. The computer-readable information in reset segment 34, at pre-assigned compute cycles during operation of blade 14, determines whether the computer-readable information in one, or both, of boot segment 36 and main segment 38 become corrupted. The state of computer-readable information on both boot segment 36 and main segment 38 is typically determined upon initiation of a boot operation of blade 14. Upon ascertaining corruption in the computer-readable information in one of boot segment 36 and main segment 38, the computer-readable information in reset segment 34 selects computer-readable information from one of boot segment 36 and main segment 38, which is not corrupted, from which to continue operation of blade 14. Should reset segment 34 determine that code corruption has occurred in either one of boot segment 36 or main segment 38, operation of blade 14 is transferred to the computer-readable information in non-corrupted segment to replace the computer-readable information in the segment in which code corruption is present. In this manner, there is appropriate computer-readable information present in embedded memory 32 to perform boot operations for blade 14 and to communicate with shelf manager 12.

To facilitate diagnostic operations by the computer-readable information in reset segment 34, each of sectors 40-45 and 50-55 includes a plurality of sub-sectors 60-64, discussed with respect to sector 50 for sake of brevity and applicable to the remaining sectors 40-45 and 51-55 of embedded memory 32. Although there are five sub-sectors 60-64 shown, any number may be present so long as each of sub-sectors 60-64 consists of no less than a range of sequential memory addresses one word (eight bits) in length. A primary sub-sector 60 is positioned at one terminus of sector 50, and a final sub-sector 64 is located at a second terminus of sector 50. All sub-sectors 61-63 having addresses between primary and final sub-sector 60 and 64 are included in sector 50. Sub-sectors 61-63 are referred to as intermediary sub-sectors. Computer-readable information stored in primary sub-sector 60 has a predefined correlation with computer-readable information stored in final sub-sector 64 such that performance of an arithmetic operation on the same, during a diagnostic routine invoked by the computer-readable information in reset segment 34, would produce a predetermined result. Should the predetermined result not occur in response to the arithmetic operation, it is ascertained that code corruption has occurred in main segment 38. An exemplary diagnostic routine may include storing information in primary and final sub-sectors 60 and 64 related to the moment when the computer readable instruction in sector 50 were recorded, e.g., year, month, date, hour and second information concerning the last moment the computer-readable information were stored therein. An exemplary mathematical operation could consist of taking a difference between the computer-readable information stored in primary and final sub-sectors 60 and 64, which should yield zero.

In accordance with another embodiment, the diagnostics routine may consist of implementation of what is referred to herein as a differential checksum routine. To that end, a checksum value for each of the sub-sectors 60-64 is determined from the computer-readable information stored therein. From this operation a plurality of checksum values is obtained. The plurality of checksum values are then summed, defining a summed checksum. Stored in intermediary sub-sector 63 is a value equal and opposite to the value of the summed checksum. The value stored in sub-sector 63 is then added to the summed checksum algorithm, with the expected value being zero. Should zero not be returned in this diagnostic routine, then code corruption would be ascertained to be present in main segment 38. An advantage of this diagnostic routine is that a greater percentage of computer-readable information stored in the addresses of main segment 38 may be analyzed for code corruption than with previous diagnostic routines.

In response to determining that code corruption has occurred employing one of aforementioned diagnostic routines, the entire quantity of computer-readable information stored in main segment 38 may be replaced under operation of the computer-readable information stored in boot segment 36. It should be understood that one or more of the aforementioned diagnostic routines may be implement to determine the state of computer-readable information in reset segment 34.

Figure 5:
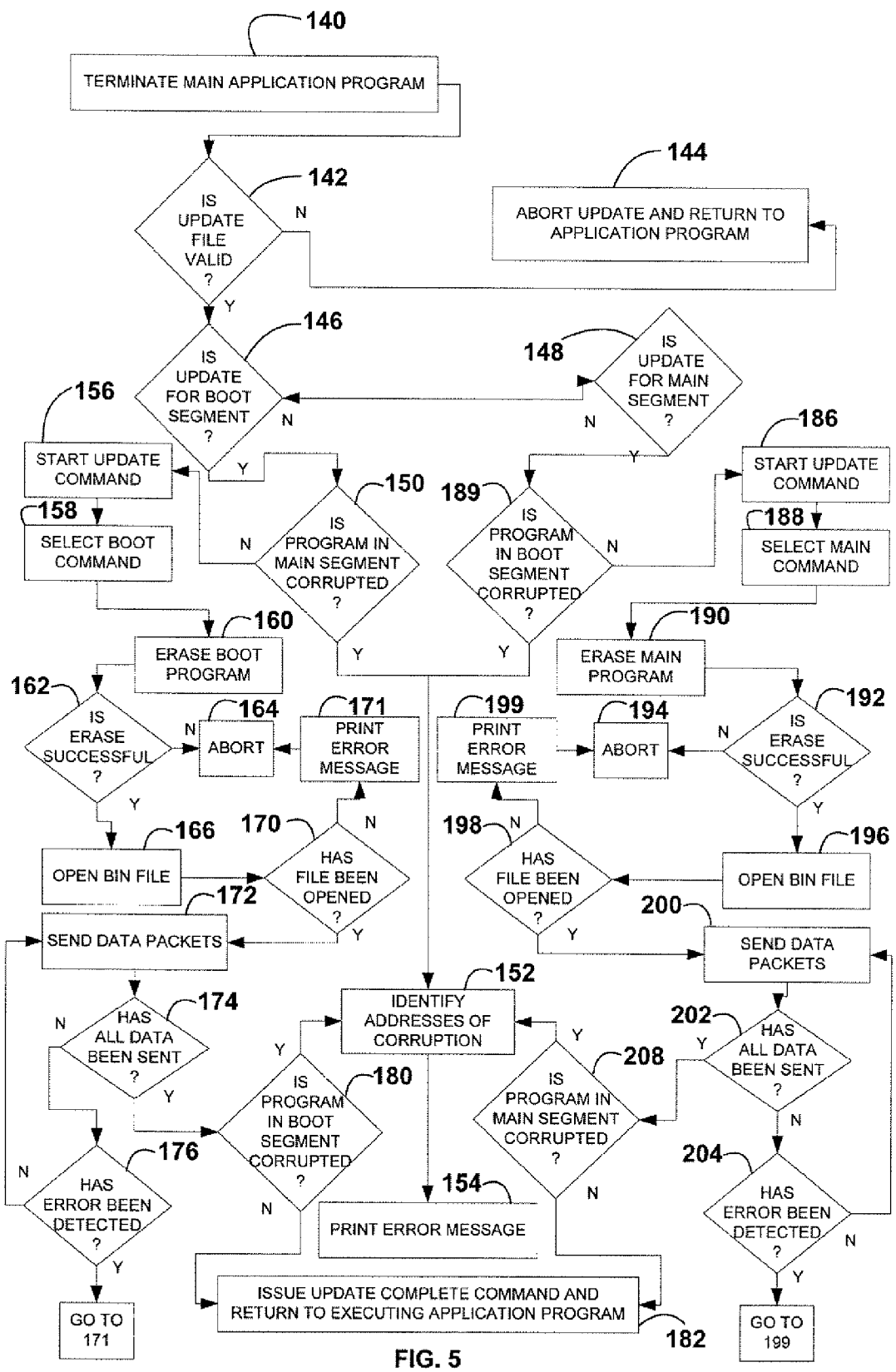
FIG. 5 is a flow diagram showing exemplary operations of a shelf manager included in the system shown in FIG. 3, in accordance with one embodiment of the present invention.
Figure 6:
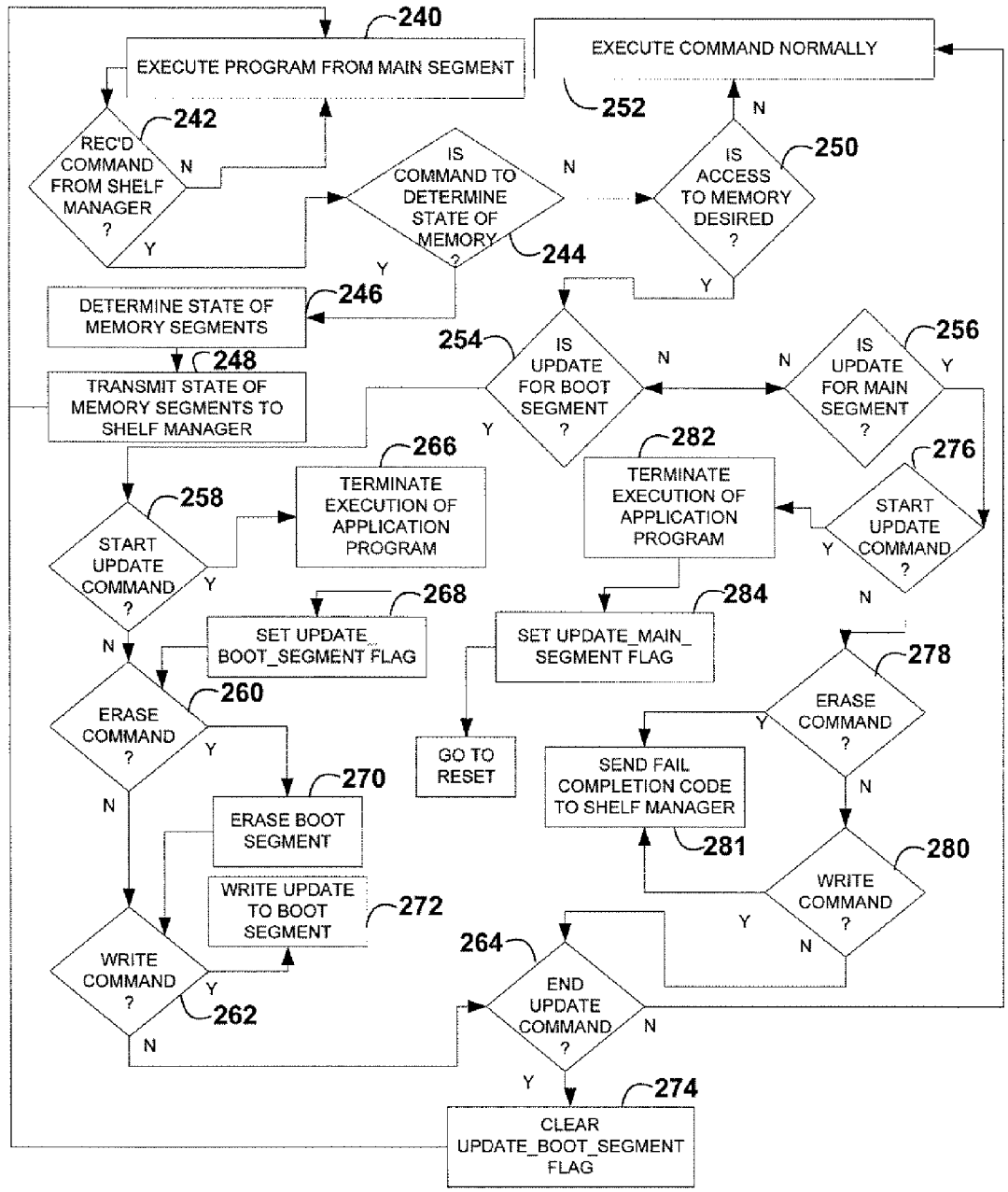
FIG. 6 is a flow diagram showing exemplary operations of a blade included in the system shown in FIG. 3, in accordance with one embodiment of the present invention.

Referring to FIGS. 5 and 6, in one embodiment of the present invention blade 14 executes application program stored in main segment 38 of embedded memory 32. Commands, or instructions, entered at user interface 20 are communicated to blade 14 vis-à-vis shelf manager 12. Were it desired to update computer-readable information in main segment 38, a terminate-main application-program commend would be generated by shelf manager 12 at function 140. At function 142 shelf manager 12 would determine whether the update file is valid. Were this not the case, shelf manager 12 would abort the update and issue a run application program command to blade 14 at function 144. Were the update file determined to be valid at function 142, then shelf manager 12 would determine at functions 146 and 148 whether the update file was to computer-readable instructions in main segment 38 or boot segment 36. Were the update file for boot segment 36, shelf manager would first determine whether code corruption was present in main segment 38 by requesting reset segment 34 to implement the diagnostic routine, as discussed above. Were it determined that code corruption was present in main segment 38, shelf manager 12 would request blade 14 to identify the addresses in embedded memory 32 where stored is the computer-readable information that was the subject of the code corruption. In response, at function 154, a print error message would be displayed on user interface 20, e.g., a computer monitor, at function 154.

Were it determined at function 150 that the computer-readable information stored in main segment 38 was in a desired state, i.e., uncorrupted, firmware update utility 21 via shelf manager 12 would issue to blade 14 a start update command. Upon receipt of an acknowledgement of the command from blade 14, shelf manager 12 would transmit a select boot command to blade 14. Upon receipt of an acknowledgement to the select boot command from blade 14, an erase boot command would be transmitted from firmware update utility 21 via shelf manager 12 to blade 14 at function 160. At function 162, firmware upgrade utility 21 via shelf manager 12 determines whether the erase was successful by receipt of an acknowledgement from blade 14. Were it determined that the erase function 162 was unsuccessful, firmware update utility 21 via shelf manager 12 would abort the update operation at 164 at which point blade 14 may resume execution of main application program in main segment 38 of embedded memory 32 or system 10 merely halt and provide an error indication at user interface 20 or a combination thereof. Were the erase determined to be successful at function 162, the file containing the information to be written to boot segment 36 would be opened on shelf manager 12 at function 166, and at function 170 firmware upgrade utility 21 via shelf manager 12 determines whether the file had been successfully opened. Were this not the case, an error message would be generated to user interface 20 at function 171 and the operation aborts at function 164.

Upon determining that the file has been opened at function 170, data packets are transmitted to blade 14 at function 172. The data packets contain the computer-readable information from the file that is to be stored in boot segment 36. In this manner, computer-readable information stored in boot segment 36 is replaced with the computer-readable information of the update. At function 174 firmware update utility 21 via shelf manager 12 determines whether all the data associated with the update had been transmitted to blade 14. Were this determined not to be the case, function 176 occurs at which point firmware upgrade utility 21 via shelf manager 12 determines whether an error has been detected during the transfer of the update to blade 14. This may be implemented employing standard error checking protocols, such as checksum protocols. If an error had been detected, the operation proceeds to function 171. Were it determined that no errors occurred during the transmission of the update to blade 14 at function 176, function 172 is resumed followed by function 174. Upon determining that all data associated with the update has been transmitted to blade 14 at function 174, the diagnostic routine is executed from reset segment 34 at function 180 to determine whether code corruption is present in boot segment 36. Were code corruption found to be present in boot segment at function 180, function 152 and 154 would occur. Were it found that no code corruption was present at function 180, then shelf manager 12 issues an update complete command to blade at function 182 and the main application program resumes execution of blade 14 from the computer-readable instructions stored in main segment 38.

An alternate embodiment, not shown may, in addition to, or in lieu of printing the error message at function 154, result in firmware update utility 21 via shelf manager 12 terminating the boot segment update operation and implement a recovery operation to restore computer-readable information in main segment 38 under control of computer-readable information stored in boot segment 36. After the computer-readable information was restored in main segment 38 so that the same is in a desired state, firmware update utility 21 via shelf manager 12 may return to updating the computer-readable information stored in boot segment 36 by returning to function 142 or 150, as desired. As a result, of either of the previously discussed embodiments, computer-readable information in boot segment 36 is not replaced unless computer-readable information in main segment 38 is in a desired state, i.e., uncorrupted state.

Were firmware update utility 21 via shelf manager 12 to determine that the update was for the computer-readable instructions contained in main segment 38, then function 184 would be implemented. Were the update file for main segment 38, shelf manager would first determine whether code corruption was present in boot segment 36 by requesting reset segment 34 to implement the diagnostic routine, as discussed above. Were it determined that code corruption was present in boot segment 36, firmware update utility 21 via shelf manager 12 would request blade 14 to identify the addresses in embedded memory 32 where stored is the computer-readable information that was the subject of the code corruption at function 152 followed by function 154 during which an error message would be generated on user interface 20.

An alternate embodiment, not shown, may, in addition to or in lieu of printing the error message at function 154, result in firmware update utility 21 via shelf manager 12 terminating a main segment update operation and implement a recovery operation of replace computer-readable information in boot segment 36 under control of computer-readable information stored in main segment 38. After the computer-readable information is recovered in boot segment 36 so that the same stored therein is in a desired state, firmware update utility 21 via shelf manager 12 may return to updating the computer-readable information stored in main segment 38 by returning to function 142 or 150, as desired. As a result of either of the previously discussed embodiments with respect to the main segment update operation, computer-readable information in main segment 38 is not replaced unless computer-readable information in boot segment 36 is in a desired state, i.e., uncorrupted state.

Were it determined at function 184 that the computer-readable information stored in boot segment 36 was in a desired state, i.e., uncorrupted, shelf manager 12 would issue to blade 14 a start update command at function 186. Upon receipt of an acknowledgement of the command from blade 14, shelf manager 12 would transmit a select main segment command to blade 14 at function 188. Upon receipt of an acknowledgement to the select main segment command 188 from blade 14, an erase main segment command would be transmitted from shelf manager 12 to blade 14 at function 190. At function 192, firmware upgrade utility 21 via shelf manager 12 determines whether the erase was successful by receipt of an acknowledgement from blade 14. Were it determined that the erase function 192 was unsuccessful, shelf manager 12 would abort the update operation at 194 at which point blade 14 may resume execution of main application program in boot segment 36 of embedded memory 32 or system 10 merely halt and provide an error indication at user interface 20 or a combination thereof. Were the erase determined to be successful at function 192, the file containing the information to be written to main segment 38 would be opened on shelf manager 12 at function 196, and at function 198 firmware upgrade utility 21 via shelf manager 12 determines whether the file had been successfully opened. Were this not the case, an error message would be generated to user interface 20 at function 199 and the operation aborts at function 194. Upon determining that the file has been opened at function 198, data packets are transmitted to blade 14 at function 200. The data packets contain the computer-readable information from the file that is to be stored in main segment 38. In this manner, computer-readable information stored in main segment 38 is replaced with the computer-readable information of the update. At function 202 firmware upgrade utility 21 via shelf manager 12 determines whether all the data associated with the update had been transmitted to blade 14. Were this determined not to be the case, function 204 occurs at which point firmware upgrade utility 21 via shelf manager 12 determines whether an error has been detected during the transfer of the update to blade 14, as discussed above with respect to function 176. If an error had been detected, the operation proceeds to function 199. Were it determined that no errors occurred during the transmission of the update to blade 14 at function 204, function 200 is resumed followed by function 202. Upon determining that all data associated with the update has been transmitted to blade 14 at function 202, the diagnostic routine is executed from reset segment 34 at function 208 to determined whether code corruption in present in main segment 38. Were code corruption found to be present in main segment at function 208, function 152 and 154 would occur. Were it found that no code corruption was present at function 208, then shelf manager 12 issues an update complete command to blade at function 182 and the main application program resumes execution of blade 14 from the computer-readable instructions stored in main segment 38.

Referring to FIGS. 3, 4 and 6, as stated above, one embodiment of the present invention includes embedded processor 30 of blade 14 executing an application program stored in main segment 38 of embedded memory 32, shown as function 240. Were a command found to have arrived at function 242, CPU 24 would then determine whether the same was to determine a state boot segment and main segment 38 at function 244. Were a DETERMINE_MEMORY_STATE command found to be present at function 244, embedded processor 30 would operate on computer-readable information in reset segment 34 to execute one or more of the aforementioned diagnostic routines at function 246. The results of function 246 would be transmitted to shelf manager at function 248. Functions 244, 246 and 248 occur periodically so that shelf manager 12 maintains an accurate status of the state of boot segment 36 and main segment 38.

Were a DETERMINE_MEMORY_STATE command not found by function 244, function 250 would occur at which point CPU 24 would determine whether an access to memory is desired. If not, the command received would be executed normally at function 252. Were function 250 to determine that an access to memory is desired, functions 254 and 256 would determine the segment of embedded memory 32 to be the subject of an update operation. Although function 254 is shown occurring first in the diagram, it is just as valid to have the sequence reversed with function 256 occurring before function 254. At function 254 it is determined whether boot segment 36 is to be the subject of the update operation. If not, function 256 would determine if main segment 38 is the subject of an update operation. Assuming boot segment 38 is the subject of an update operation, embedded processor 30 determines at function 258 whether a start UPDATE command has been received from shelf manager 12. If not, embedded processor 30 determines at function 260 whether an ERASE command have been received from shelf manager 12. If not, embedded processor 30 determines at function 262 whether a WRITE command had been received. If not embedded processor 30 determines at function 264 whether an END_UPDATE command was received at function 266. If not the command is executed normally at function 252.

Were embedded processor 30 to determine, at function 258, that a START UPDATE command was received, execution of application program would be terminated at function 266. At function 268 a UPDATE_BOOT_SEGMENT flag would be set in RAM 29 by embedded processor 30. Blade 14 would then await an ERASE command, which would be determined to arrive at function 260 and would result in boot segment 36 being erased at function 270. Blade 14 would then await a WRITE command, which would be determined to arrive at function 262 and would result in boot segment 36 being written to with update information at function 272. Thereafter, blade 14 would then await an END_UPDATE command at function 264 which, when received would result in clearing of UPDATE_BOOT_SEGMENT flag in RAM 29 at function 274.

Were it determined at function 256 that main segment 38 was to be the subject of an update operation, embedded processor 30 could undertake functions 276, 278, 280 and 282, which are identical to functions 258, 260, 262 and 266, respectively. However, were an ERASE or WRITE command found at functions 278 and 280, respectively, a fail completion code, at function 281, would be transmitted to shelf manager 12, because read/write access to main segment 38 is not permitted when blade 14 is executing computer-readable information stored in main segment 38. Rather, computer-readable information stored in reset segment 34 first causes embedded processor 30 to execute from computer-readable information stored in boot segment 36 before read/write access is granted to main segment 38. To that end, following termination of execution of application program at function 282, embedded processor 30, at function 284 sets an UPDATE_MAIN_SEGMENT flag in RAM 29. Following function 284, embedded processor 30 processor jumps to reset segment 34 to execute computer-readable information stored therein at function 286, shown in FIG. 7.

Figure 7:
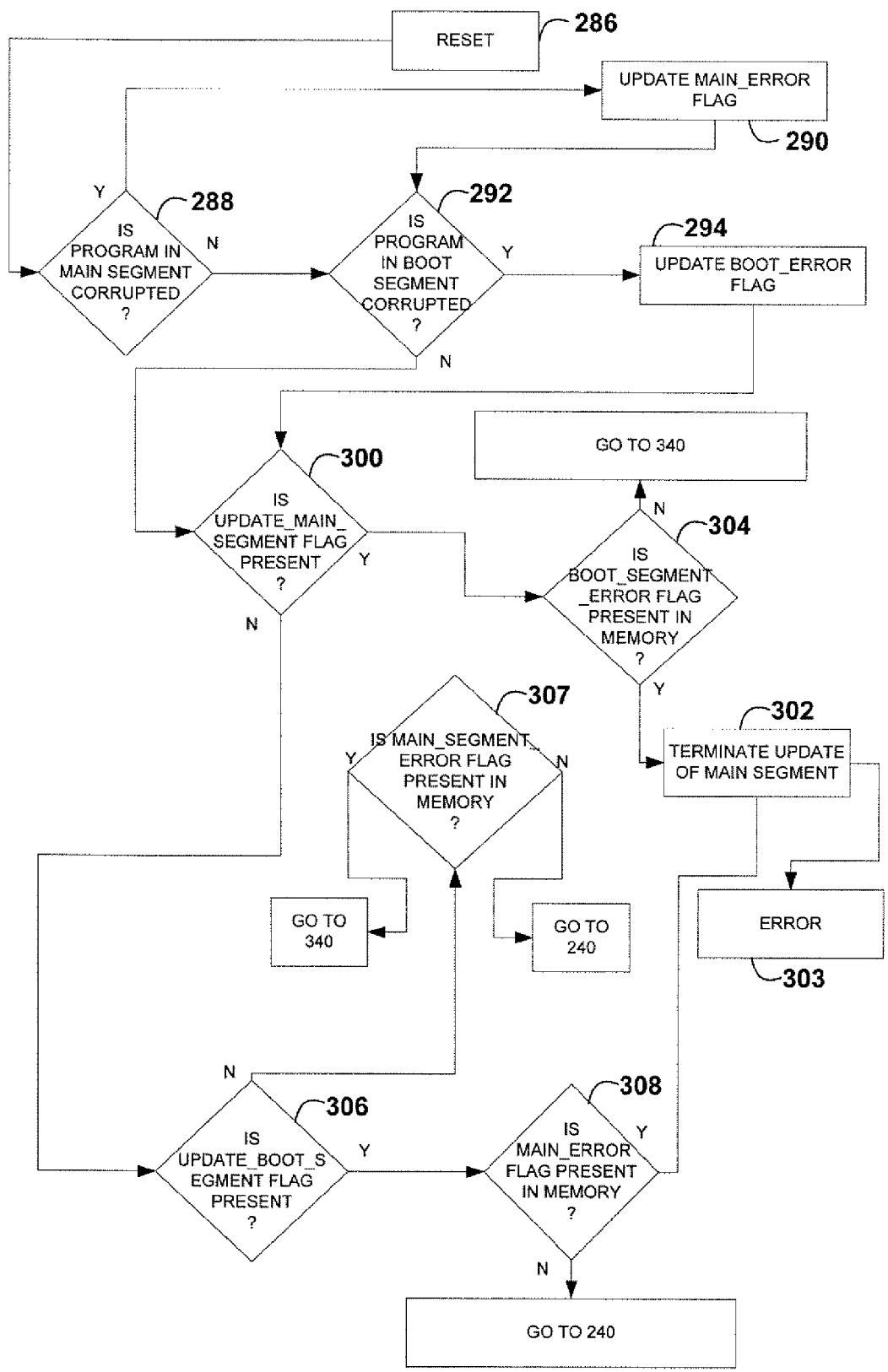
FIG. 7 is a flow diagram showing exemplary operations of a blade included in the system shown in FIG. 3, in accordance with the present invention.

Referring to both FIGS. 3 and 7 embedded processor 30 executing computer-readable information stored in reset segment 34 determines whether the program in main segment 38 is corrupted at function 288, employing one or more of the aforementioned diagnostic routines. Were this the case, an UPDATE_MAIN_SEGMENT_ERROR flag would be set in RAM 29 by embedded processor 30 at function 290. At function 292, embedded processor 30 determines whether the program in boot segment 34 is corrupted employing one or more of the aforementioned diagnostic routines. Were this the case, an UPDATE_BOOT_SEGMENT_ERROR flag would be set in RAM 29 by embedded processor 30 at function 294. Following either function 292 or 294, embedded processor 30 determines at function 300 whether UPDATE_MAIN_SEGMENT flag is present in RAM 29. If not, embedded processor 30 determines, at function 306, whether UPDATE_BOOT_SEGMENT flag is present in RAM 29. If not, embedded determines whether RAM 29 includes a MAIN_SEGMENT_ERROR flag. If not, the operation proceeds to function 240 on FIG. 6; otherwise, the operation proceeds to function 340 shown in FIG. 8 and discussed more fully below.

Referring again to both FIGS. 3 and 7, were it determined at function 306 that the UPDATE_BOOT_SEGMENT flag is present in RAM 29, embedded processor 30 determines at function 308 whether a MAIN_SEGMENT_ERROR flag is present in RAM 29. If not, the operation proceeds to function 240 on FIG. 6; otherwise the update operation is terminated at 302, shown in FIG. 7, and an error occurs at function 303. It should be understood that the present invention avoids operations 302 and 303 from occurring following function 308. Therefore, the sequence of function 308, 302 and 303 is determined to be a highly improbably condition due, inter alia, to the synergism between shelf manager 12 and blade 14. Specifically, blade 14 does not allow shelf manager 12 to access main segment 38 unless an UPDATE_BOOT_SEGMENT flag is present in RAM 29, thereby protecting the computer-readable information therein from inadvertently being erased, overwritten or otherwise corrupted. Function 308 provides double protection so that access to main segment 38 is prevented, in the presence of UPDATE_BOOT_SEGMENT flag in RAM 29 in the event that a MAIN_SEGMENT_ERROR flag were also in RAM 29. In this manner, main segment 36 is ensured to be in a desired state so that should code corruption result from an update operation of computer-readable information in boot segment 36. This makes available computer-readable information in main segment 38 to facilitate a recovery operation of previously existing computer-readable information in boot segment 36 or replacing the same with an update operation.

Referring again to both FIGS. 3 and 7, were it determined at function 300 that UPDATE_MAIN_SEGMENT flag is present in RAM 29, embedded processor 30 carries-out function 304 to determine whether a BOOT_SEGMENT_ERROR flag is present in RAM 29. Were this the case, then the update operation would terminate at function 302 and an error would occur at function 303. It should be understood that the present invention avoids operations 302 and 303 from occurring following function 304. Therefore, the sequence of functions 304, 302 and 303 is determined to be a highly improbably condition due, inter alia, to the synergism between shelf manager 12 and blade 14. Specifically, blade 14 does not allow shelf manager 12 to access main segment 38 unless an UPDATE_MAIN_SEGMENT flag is present in RAM 29, thereby protecting the computer-readable information therein from inadvertently being erased, overwritten or otherwise corrupted. Function 304 provides double protection so that access to main segment 38 is prevented, in the presence of UPDATE_MAIN_SEGMENT flag in RAM 29 in the event that a BOOT_SEGMENT_ERROR flag were also in RAM 29. In this manner, boot segment 36 is ensured to be in a desired state so that should code corruption result from an update operation of computer-readable information in main segment 38. This makes available computer-readable information in boot segment 36 to facilitate a recovery operation of previously existing computer-readable information in main segment 38 or replacing the same with an update operation. However, were a BOOT_SEGMENT_ERROR flag not present in RAM 29 at function 304, operation 340 of FIG. 8 would occur, discussed more fully below.

Figure 8:
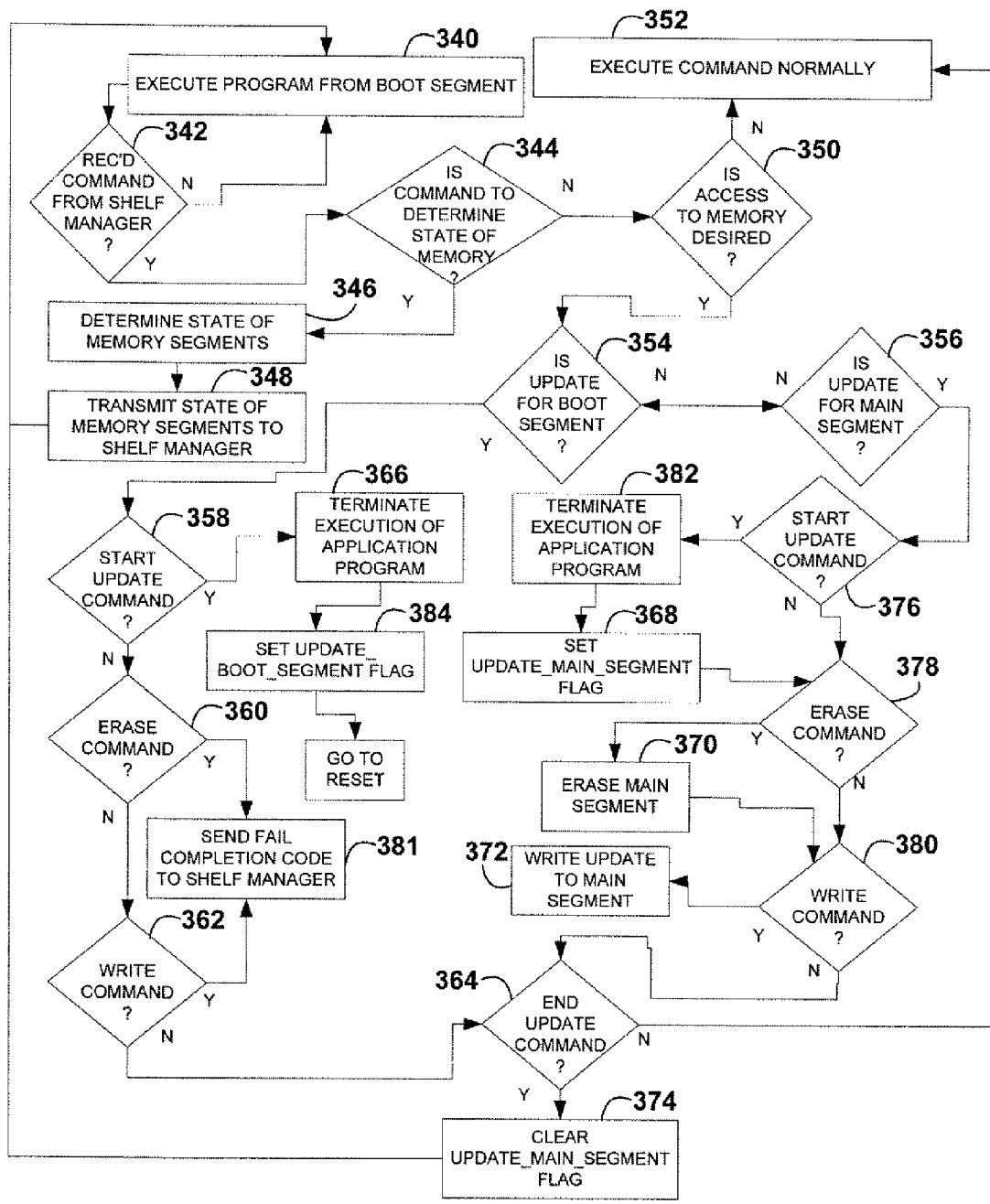
FIG. 8 is a flow diagram showing exemplary operations of a blade included in the system shown in FIG. 3, in accordance with an alternate embodiment of the present invention.

Referring to FIGS. 3 and 8, shown is the method to obtain read/write access to embedded memory 32 when embedded processor 30 is executing computer-readable information stored in boot segment 36. Nonetheless there are similar functions carried out that are common between the two methods. Specifically, functions 242, 244, 246, 248, 250, 252, 254, 256, 258, 260, 262, 264, 266, 276, 278, 280 and 282 of FIG. 6 are identical to functions 342, 344, 346, 348, 350, 352, 354, 356, 358, 360, 362, 364, 366, 376, 378, 380 and 382 of FIG. 8. However, considering that embedded processor 26 of FIG. 3 is executing computer-readable information stored in boot segment 36 upon receipt of an update operation at function 350, shown in FIG. 8, it becomes manifest that embedded processor 32 of FIG. 3 should execute computer-readable information stored in main segment 38 before allowing read/write access to boot segment 36.

Referring to both FIGS. 3 and 8, following function 366 a UPDATE_BOOT_SEGMENT flag is written to RAM 29 at function 384 and then function 286 occurs, shown in FIG. 7 and the reset routine is carried-out as discussed above. In this manner, execution of computer-readable information stored in boot segment 36, shown in FIG. 3, is terminated, and embedded processor 26 executes computer-readable information stored in main segment 38 before read/write access to boot segment 36 occurs. Should an ERASE or WRITE command be received while embedded processor 30 is executing from computer-readable information stored in boot segment, a fail completion code instructions is sent to shelf manager 12 at function 381, shown in FIG. 8.

Referring again to both FIGS. 3 and 8, were read/write access to main segment 38 desired while embedded processor 30 executed computer-readable information stored in boot segment 36, following termination of execution of application program at function 382, an UPDATE_MAIN_SEGMENT flag would be set in RAM 29. Thereafter, ERASE and WRITE commands would be undertaken at functions 370 and 372, respectively without having to invoke the reset routine.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for protection of non-redundant information stored in a memory having multiple segments, said method comprising:
    replacing computer-readable information stored in one of said multiple segments based upon a determination that computer-readable information stored in one of the remaining segments of said multiple segments is in a desired state; and
    providing said one of the remaining segments with a plurality of sectors, including a primary sector and a final sector and an intermediary sector and further including determining a checksum value for each of said plurality of sectors, excepting said intermediary sector, forming a plurality of checksum values and summing said plurality of checksum values, defining a summed checksum, and storing in said intermediary sector a stored value equal to an opposite of said summed checksum.

2. The method as recited in claim 1 wherein replacing further includes determining whether said computer-readable information stored in said one of the remaining segments is in a state selected from a set of states consisting essentially of a corrupted state and an uncorrupted state, with said desired state being said uncorrupted state.

3. The method as recited in claim 1 further including initiating a boot operation and determining whether computer-readable information stored in any of said multiple segments has been placed in an undesired state, with said replacing computer-readable information including identifying said one of said multiple segments being in said undesired state.

4. The method as recited in claim 1 wherein each of the plurality of sectors has a range of addresses associated therewith and identifying a subgroup of said plurality of sectors in which computer-readable information has been corrupted, defining corrupted information with said replacing computer-readable information further including replacing said corrupted information.

5. The method as recited in claim 1 wherein said information stored in said primary sector and said final sector consists essentially of a data concerning a year, a month, a day, an hour and a second upon which information stored in said one of the remaining segments occurred.

6. A method for protection of non-redundant information stored in a memory having multiple segments, said method comprising:
    replacing computer-readable information stored in one of said multiple segments based upon a determination that computer-readable information stored in one of the remaining segments of said multiple segments is in a desired state;
    providing said memory with three segments of memory addresses, defining a reset segment, a boot segment, and a main segment with said reset segment storing hardware specific information and diagnostic code to determine whether computer-readable information in said boot segment and said main segment is in a corrupted state, said boot segment storing computer-readable information to perform power-on tests and self-test and said main segment storing computer-readable information for application specific software.

7. The method as recited in claim 6 wherein determining further includes determining whether said computer-readable information stored in said boot segment and said main segment are corrupted without determining whether said computer-readable information stored in said reset segment is in a corrupted state.

8. A non-transitory computer-readable medium for protection of non-redundant information stored in a memory having multiple segments, said computer-readable medium comprising:
- code to replace computer-readable information stored in one of said multiple segments based upon a determination that computer-readable information stored in one of the remaining segments of said multiple segments is in a desired state;
- code to provide said memory with three segments of memory addresses, defining a reset segment, a boot segment, and a main segment with said reset segment storing hardware specific information and diagnostic code to determine whether computer-readable information in said boot segment and said main segment is in a corrupted state, said boot segment storing computer-readable information to perform power-on tests and self-test and said main segment storing computer-readable information for application specific software.

9. The non-transitory computer-readable medium as recited in claim 8 wherein said code to replace further includes code to determine whether said computer-readable information stored in said one of the remaining segments is in a state selected from a set of states consisting essentially of a corrupted state and an uncorrupted state, with said desired state being said uncorrupted state.

10. The non-transitory computer-readable medium as recited in claim 8 further including code to identify valid update program information to be written into addresses of said one of said multiple segments.

11. The non-transitory computer-readable medium as recited in claim 8 further including code to initiate a boot operation and determining whether computer-readable information stored in any of said multiple segments has been placed in an undesired state, with said code to replace computer-readable information including code to identify said one of said multiple segments being in said undesired state.

12. The non-transitory computer-readable medium as recited in claim 8 further including code to provide said one of said multiple segments with a plurality of sectors, each of which has a range of addresses associated therewith and code to identify a subgroup of said plurality of sectors in which computer-readable information have been corrupted, defining corrupted information with said code to replace further including code to replace said corrupted information.

13. The non-transitory computer-readable medium as recited in claim 8 wherein said diagnostic code to determine includes diagnostic code to determine whether said computer-readable information stored in said boot segment and said main segment are corrupted without determining whether said computer-readable information stored in said reset segment is in a corrupted state.

\* \* \* \* \*